Jan. 1, 1963  M. M. FROMM ET AL  3,071,496
EPOXY RESIN IMPREGNATION OF ELECTRICAL MEMBERS
Filed April 30, 1959

INVENTORS.
Marvin M. Fromm
Ralph C. Lauro
BY Webb, Mackey & Burden

THEIR ATTORNEYS

United States Patent Office 3,071,496
Patented Jan. 1, 1963

3,071,496
EPOXY RESIN IMPREGNATION OF
ELECTRICAL MEMBERS
Marvin M. Fromm, Glenshaw, and Ralph C. Lauro, Pittsburgh, Pa., assignors to Motor Coils Manufacturing Company, Pittsburgh, Pa., a corporation of Pennsylvania
Filed Apr. 30, 1959, Ser. No. 809,952
10 Claims. (Cl. 117—218)

In the electrical industry, electrical equipment such as magnetic coils, field coils, rotors, stators, and the like, are treated with a coating of insulating varnish after assembly. In many of the processes in use, the varnish is applied to the electrical apparatus by spray coating or dipping.

Our invention relates to the treatment of electrical equipment, and particularly heavy electrical equipment such as field coils, rotors and stators by application of an insulating material thereto. Our invention specifically relates to a process by which the electrical equipment is completely encased in an insulating material. Our process and product are quite different from prior processes and equipment in that such prior processes provided merely a surface coating for insulation purposes and left large air voids between the coils and in the electrical equipment.

Our invention is further directed to the use of an insulating material which does not create the fire hazard which is present in the use of the varnish treating processes.

The insulation applied to the coils of stationary and rotating electrical equipment must separate the voltage impressed or generated in the conductors from the ground potential for long periods of time. To do this successfully, the insulation must maintain its dielectric strength and its mechanical strength under the influence of many deteriorating forces. These forces include electrical stress, corona, chemicals resulting from corona in air, heat, moisture, oil and chemicals, mechanical stresses due to vibration, expansion and contraction, and many others. Many attempts have been made in the past to design insulation materials which would meet some or all of these conditions. The recent development of solvent-less, thermosetting resins of the polyester-styrene copolymer and epoxy types provides insulation characteristics which approach those desired in the end product. However, prior to our invention, no one had been able to make effective use of these resins to solve the insulation problem on electrical equipment.

We have invented a new combination of materials and a process for using these materials in insulating electrical equipment, particularly armature coils, both rotating and stationary, and non-salient field coils, which achieves the long-sought after results in a finished product. Our invention also relates to coils which are formed and provided with insulating materials before they are wound into the slots of an armature.

In the following drawings, we have described a presently preferred embodiment of our invention in which.

Figure 1:
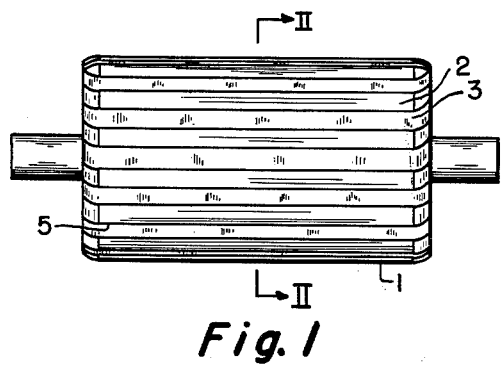
FIGURE 1 is a side elevation view of an armature made according to our invention.

Briefly, the present invention comprises a process wherein stationary and rotating electrical machinery is impregnated with a solvent-less, thermosetting, epoxy resin. This impregnation step is accomplished by subjecting the apparatus to a vacuum within a container and then flooding the container with the epoxy resin and subjecting the surface of the epoxy resin to a pressure. In this way, the entire apparatus is impregnated with the epoxy resin and all voids and interstices therein filled with the resin.

The conductors of the coils are individually insulated with glass fiber or a combination of glass fiber and polyester resin fiber. These fibers are in the form of a matte which is wrapped around the conductors of the coil. After the conductors are so wrapped, they are coated with varnish or resin and cured. If the voltage between the conductors is very high, insulating tape consisting of mica splittings and a glass cloth support is normally used with the mica splittings bonded to the glass cloth by a small amount of epoxy resin. The insulated conductors are then wound into a coil form which may be pressed and bonded with epoxy resins to maintain a desired size depending upon the particular coil design being used.

After the insulated conductors have been formed into a coil, additional insulation is provided to separate the conductors from ground potential at coil testing and operating voltages. This additional insulation normally consists of either wrappings of sheet material primarily composed of mica splittings between glass cloth bonded with a small amount of epoxy resin, or multiple layers of tape slit from material similar to the sheet material used for wrapping the individual conductors. The particular insulating material and the manner in which it is applied depends in a large degree to the particular coil design being used.

The further processing of the coils from this point depends upon the size of the machine to be wound. If the machine is relatively small, below about 5,000 H.P., the coils are wound into the slots in the core, connected in the conventional manner, and the connections insulated with an epoxy-bonded, glass-mica tape. The coils are quite flexible prior to winding and can undergo the twisting necessary to properly wind them on the core, without encountering damage to the coils or core.

After the coils have been properly wound on the core, the entire apparatus is preheated for several hours at a temperature above 100° C. and preferably, in the range of 100–130° C. for two to six hours to remove any moisture and solvent from the apparatus. An armature 10 inches in diameter is preheated about three hours at 100° C. Obviously, as the temperature is increased, the period of time to remove any residual solvent and moisture is decreased.

Following preheating, the apparatus is placed inside a pressure-tight vessel which is then evacuated to an absolute pressure below 20 mm. mercury, and preferably below 10 mm. mercury. This high vacuum adequately removes any air entrapped within the apparatus. The apparatus is maintained in this evacuated vessel for a sufficient period of time to ensure proper removal of entrapped air, normally less than one hour. Then without removing the vacuum from the vessel, an epoxy resin-hardener mixture is admitted into the vessel in sufficient amount to completely immerse the apparatus. The mixture is preferably maintained at about room temperature, although any temperature may be used providing the mixture has a sufficiently low viscosity to have the proper flow characteristics which permit its entry into the openings and interstices of the electrical apparatus. The surface of the mixture is then subjected to an air pressure of 80–125 p.s.i. for several hours to ensure that the mixture properly enters the interstices in the electrical apparatus. The minimum pressure to which the mixture should be subjected in the vessel is about 50 p.s.i. for a maximum of 24 hours. However, as the pressure is increased, the time during which the apparatus must be subjected to the pressure decreases. For example, at 100 p.s.i., a period of about 12 hours is sufficient. The mixture when subjected to this pressure, flows into every opening in the electrical apparatus, including openings within the coils, between the coils and slot walls, between the laminations of the core, and into every small opening in the insulation of the apparatus.

The vessel is then opened, the electrical apparatus removed and, without draining any of the mixture from the internal structure of the electrical apparatus, the entire apparatus is mounted on a spindle capable of rotation. The spindle is of known construction (see U.S. Patent No. 2,561,982) and does not require description herein. In the case of the armature, it is preferable that the armature be rotated about its longitudinal axis, but with other electrical apparatus, this is not always possible. The important consideration is to avoid draining of the mixture from the apparatus. The electrical apparatus mounted on the spindle is either originally positioned in a baking oven or is movable into the baking oven. The electrical apparatus and spindle are rotated at a slow speed while being heated in the oven to cure the mixture in and on it. The oven is heated in the range of about 100–400° C. and preferably at about 250–350° C. The time of heating employed takes into account the time for bringing the apparatus to curing temperature, the time for the resin-hardener mixture to gel and the time to effect curing of the resin. Continuous rotation of the apparatus prevents any loss of resin as the viscosity of the mixture decreases during the initial heating prior to curing. We prefer to rotate the electrical apparatus between about 1–15 r.p.m. A speed sufficiently high to cause centrifugal force to fling the mixture from the apparatus should be avoided.

The electrical apparatus produced by the above process has the following characteristics and properties. The entire coil structure is filled with solid resin and the space in the slot between the coil and the slot wall and between coils is also solidly filled with resin. Consequently, the dielectric strength of the apparats is at a maximum. Since there is no air present within the coil, ionization and corona cannot occur. Furthermore, the heat transfer between the conductors and the core material is at a maximum value because of the superior heat conduction through the resin in comparison to air which is normally present in this area. Therefore, the conductor temperature is much lower, thus ensuring a longer thermal life of the insulating structure than is normally achieved with a varnished structure. Further, the coil is solidly locked in the core slot making the coil immune to vibration and expansion stresses on the insulation. The coil structure which is solidly filled with epoxy resin is completely impervious to water, oils, chemicals and solvents. We have found that a 2 foot diameter armature from a railway traction motor which was treated according to our process maintained insulation resistance when tested at 2,500 volts D.C. at 10,000 megohms for 20 minutes while immersed in water to slightly below the commutator. By way of comparison, armatures wound in the best and most modern, but conventional manner, and varnish treated lost insulation resistance down to 500 ohms within 45 seconds after immersion in water in a similar test.

If the electrical apparatus is of such size that it cannot be rotated in the manner described above, such as turbine generators of 2,500 kw. and above, and water-wheel generators of any size, or if the coils are to be wound on the core in a field location, the apparatus is processed in a different manner than that described above. In such a situation, the individual coils are each impregnated with an epoxy resin-hardener mixture. These coils are individually formed and then subjected to a vacuum step and an impregnation under pressure step as described above. The same times, pressures and vacuums are used as recited above. Immediately after the coils are removed from the pressure-tight vessel after impregnation, the excess mixture is wiped from the surface of the coil and the surface is coated with a thin epoxy film which immediately sets and seals the coil against leakage of the mixture therefrom. We have found that the most satisfactory outside coating is a solution of epoxy varnish which dries to leave an impervious film or an epoxy resin solution which cures at room temperature in a short time. A function of this film is to seal in the epoxy resin-hardener mixture in the coil and prevent its leakage therefrom so that, after the coil is installed upon its electrical apparatus, the resin-hardener mixture may be cured.

These treated coils are then taken to a field location where they are wound onto the particular electric apparatus being repaired and either subjected to a baking in an oven at the temperatures indicated above or electrical current is passed through the conductors to fully cure the epoxy resin in the impregnated coils.

The treated coils, prior to their winding upon the electric apparatus and prior to curing, remain flexible for a long period of time and thus, the shelf life of such coils is very great. The coils will not normally harden so that they cannot be used until heat is applied to cure the resin. We have found that the treated coils may be distorted in winding them upon the core of electrical apparatus without damage to the insulation and to the impregnation of the epoxy resin. Once the coils are wound upon the electrical apparatus, connections are made to the electrical apparatus in the conventional manner and the connections properly insulated.

Coils impregnated with epoxy resin, according to the above process, undergo a slight swelling or expansion due to the resin fill. Thus, when the coils are wound onto the core of electrical apparatus, they are very tight in the slots in the core. Thus, after curing, the coils are well bonded to the slots. We have found that by using coils impregnated according to the present invention, the finished electrical apparatus (for example, an armature) has superior dielectric strength, heat transfer ability, and resistance to oil, water, etc. than has electrical apparatus finished according to the normal varnish impregnation process.

Figure 2:
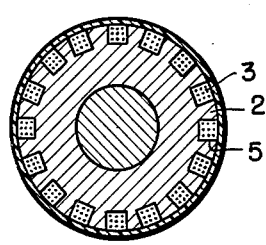
FIGURE 2 is a cross section taken on line II—II of FIGURE 1.
Figure 3:
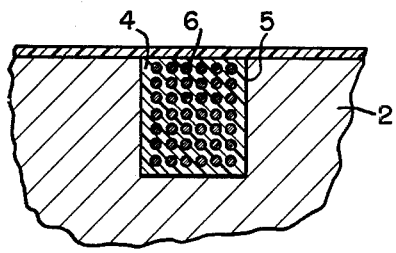
FIGURE 3 is an enlarged view of a part of FIGURE 2.

FIGURES 1 to 3 inclusive show an armature 1 of an electric motor having a core structure 2 and coils 3 which armature has been subjected to our method so that spaces in the coils and core structure have been filled with cured epoxy resin 4. As shown in FIGURES 2 and 3, all spaces in the slots 5 of the armature in which slots are disposed, the coils 3 each comprising a plurality of current carrying conductors 6 have been filled with the cured epoxy resin 4. Specifically, all the spaces between conductors and between conductors and the walls of the slots are solidly and completely filled with the cured epoxy resin.

Figure 5:
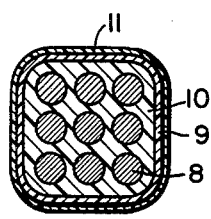
FIGURE 5 is a cross section taken on line V—V of FIGURE 4.
Figure 4:
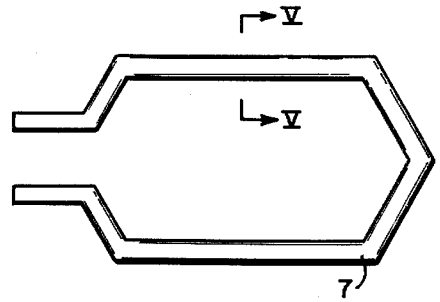
FIGURE 4 is a side elevation of a coil made according to the present invention.

FIGURES 4 and 5 show a coil 7 of electric apparatus such as a coil for an armature of an electric motor which coil comprises a plurality of current carrying conductors 8 and insulation 9 wrapped about the conductors. The coil 7 of FIGURES 4 and 5 has been subjected to our method and has all the spaces between its conductors 8 and between the conductors and the insulation 9 filled with epoxy resin-hardener mixture 10. An epoxy varnish film 11 has been applied to the coil 7 in accordance with our method and it surrounds the coil and prevents the epoxy resin-hardener mixture from escaping or leaking from the coil. Subsequently, the coil is wound upon an armature and the epoxy resin cured as described.

We have found that epoxy resins which produce satisfactory results are bisphenol-epichlorohydrin polymers which have an epoxide equivalent of about 180–205. An epoxide equivalent is grams of resin containing one gram equivalent of epoxide. Preferably, these epoxy resins have a viscosity of about 40–160 poises at 25° C. Examples of satisfactory epoxy resins are as follows:

| | Epoxide Equivalent | Viscosity at 25°C., poises | Manufactured by: |
|---|---|---|---|
| "820" | 185–205 | 40–100 | Shell Chemical Co. |
| "828" | 185–205 | 100–160 | Do. |
| "6005" | 180 | 130 | Ciba Co. |
| "D.E.R. 331" | 187–193 | 110–160 | Dow Chemical Co. |

Hardeners or curing agents for the epoxy resins which have been found satisfactory in practicing our method are high temperature hardeners which do not react with the epoxy resin at room temperature for about six weeks, which react with the resin in about three to five hours at temperatures of about 200–400° F. and whose resinous reaction product has suitable thermal stability, electrical and physical properties for use in rotating electrical machinery. The hardener functions as a catalyst in the epoxy resin-hardener mixture to bring about polymerization and reacts with the epoxy resin to effect polymerization of the epoxy and form cross linkages with the epoxy.

It is important that the hardener be such that when mixed with the epoxy resin, the mixture has a viscosity of about 40–60 poises at 25° C. and preferably a viscosity of about 40–45 poises at 25° C. This is because during the period the electrical apparatus or coil is immersed in the epoxy resin-hardener mixture and is subjected to pressure, the mixture must be sufficiently fluid so that it fills all voids and interstices in the apparatus or coil.

Preferably the hardener has a pot life in excess of several days whereby a quantity of the resin-hardener mixture is useable without danger of solidification.

Examples of hardeners which we have found satisfactory include boron trifluoride amine complexes such as $BF_3(NH_2CH_2CH_3)$ called "$BF_3$–400" and manufactured by the Shell Chemical Company. Another hardener is methyl nadic anhydride manufactured by the Allied Chemical Corporation. This hardener requires a promoter for use therewith such as alpha methyl benzyl dimethyl amine.

An additional hardener is a mixture of 66.4 parts of cresyl borate and 55.9 parts of cresyl triethanolamine titanate.

Set forth below are some epoxy resin-hardener mixtures which we have found bring about good results:

| | Percent | Percent Preferred |
|---|---|---|
| 1. Epoxy Resin | 96.5–99 | 97 |
| $BF_3(NH_2CH_2CH_3)$ | 3.5–1 | 3 |
| 2. Epoxy Resin | 70–40 | 54.5 |
| Methyl Nadic Anhydride | 30–60 | 45 |
| Alpha Methyl Benzyl Dimethylamine | 0.2–1 | 0.5 |

We have found satisfactory the following film forming mixtures used in coating the outside of the coils such as those of FIGURES 4 and 5:

| | Percent | Percent Preferred |
|---|---|---|
| 1. Epoxy Resin with an epoxide equivalent of about 225 | 65–85 | 73 |
| Triethylene Tetramine | 5–12 | 7 |
| Methylethylketone | 15–35 | 20 |
| 2. Epoxy Resin with an epoxide equivalent of 185–205 | 65–85 | 74 |
| Diethylene triamine | 4–10 | 11 |
| Methylethylketone | 10–25 | 15 |
| 3. Epoxy Varnish such as "AC–40" marketed by John C. Dolph Company | | |

Specific examples of carrying out our method are as follows:

*Example 1*

A D.C. armature 22 inches in diameter and weighing 2,500 pounds was preheated for 8 hours at 250° F. Then it was subjected to a vacuum of 3 mm. Hg absolute for one hour and while subjected to the vacuum, immersed in a mixture of 88% epoxy resin having an epoxide equivalent of 185–205 and a viscosity of 100–160 poises at 25° C. and of 12% hardener composing a mixture of 66.4 parts of cresyl borate and 55.9 parts of cresyl triethanolamine titanate for 12 hours under an air pressure of 100 p.s.i. Next the armature was removed from the resin-hardener mixture and mounted upon a stand where it was rotated for 12 hours while being heated to a temperature of 300° F. in a circulating air furnace. The armature was tested by immersion in water to the commutator riser continuously for six days. At the end of six days, its insulation resistance at 2,500 volts D.C. was 10,000 megohms.

*Example 2*

A D.C. armature 20 inches in diameter and weighing 2,100 pounds was preheated for 6 hours at 280° F. and then subjected to a vacuum of 3 mm. Hg absolute for one hour. After one hour and while subjected to the vacuum, it was immersed in a mixture composing 88% epoxy resin having an epoxide equivalent of 185–205 and a viscosity of 100–160 poises at 25° C. and 12% hardener composing a mixture of 66.4 parts of cresyl borate and 55.9 parts of cresyl triethanolamine titanate. While immersed in the mixture of epoxy resin and hardener, the armature was subjected to a pressure of 100 p.s.i. for 12 hours. Next it was removed from the mixture and placed in a circulating air oven upon a stand where it was rotated for 12 hours at 300° F. to cure the epoxy resin. The finished armature was tested electrically using 4,000 volts D.C. without failure and then was immersed in water for 6 hours. At the end of 6 hours, its insulation resistance was 10,000 megohms when tested at 2,500 volts D.C. Thereafter, it was moved to another location where it was further tested for two days and then subjected to 500 D.C. volts. Its insulation resistance then was in excess of 1,000 megohms.

*Example 3*

A set of armature coils for a 600 volt machine was preheated for 2 hours at 200° F. and then subjected to a vacuum of 5 mm. mercury absolute for one hour. The coils while still subjected to the vacuum were then immersed in a mixture of 88% epoxy resin having an epoxide equivalent of 185–205 and a viscosity of 100–160 poises at 25° C. of 12% hardener composed of a mixture of 66.4 parts of cresyl borate and 55.9 parts of cresyl triethanolamine titanate. While immersed in the epoxy resin-hardener mixture, the coils were subjected to a pressure of 100 p.s.i. for about 2 hours. Then the coils were removed from the resin-hardener mixture and excess mixture wiped therefrom. Next, each coil was sprayed with an epoxy varnish to form a film which seals in the epoxy resin-hardener mixture and prevents its leakage from each coil. Sometime later the coils were wound upon the armature of the 600 volt machine and the epoxy resin cured by passing current through the coils.

While we have described presently preferred embodiments of our invention, it may be otherwise embodied within the scope of the following claims.

We claim:

1. In the method of insulating an electrical member of an apparatus which member has current carrying conductors disposed thereon, the steps comprising subjecting the electrical member to a vacuum below 20 mm., then with the electrical member subjected to said vacuum, immersing it into a mixture of an epoxy resin and a hardener, then subjecting the mixture to a pressure of at least 50 p.s.i., then removing the electrical member from the mixture and rotating it about its central axis at a speed sufficiently low to avoid throwing off said mixture adhering thereto while curing the epoxy resin by heating the member to a temperature of about 100–400° C. to cure the epoxy resin-hardener mixture, said epoxy resin being a bisphenol epichlorohydrin polymer having an epoxide equivalent of about 180–205, said hardener effecting curing of said epoxy resin during heating of the member.

2. The method of claim 1 characterized by said epoxy resin-hardener mixture having a viscosity of about 40–60 poises at 25° C.

3. The method of claim 1 characterized by said epoxy resin-hardener mixture composing 96.5 to 99% epoxy resin and 1–3.5% boron trifluoride amine complex.

4. The method of claim 1 characterized by said epoxy resin-hardener mixture being 40–70% epoxy resin, 30–60% methyl nadic anhydride and 0.2–1% alpha methyl benzyl dimethylamine.

5. The method of claim 1 wherein said electrical member is an armature.

6. In the method of insulating an electrical member of an apparatus which member has current carrying conductors disposed thereon, the steps comprising preheating said electrical member at a temperature of at least 100° C., then subjecting the electrical member to a vacuum, then with the electrical member subjected to said vacuum below 20 mm., immersing it into a mixture of an epoxy resin and a hardener, then subjecting the mixture to a pressure of at least 50 p.s.i., then removing the electrical member from the mixture and rotating it about its central axis at a speed sufficiently low to avoid throwing off said mixture adhering thereto while heating the member to a temperature of about 100–400° C. to cure the epoxy resin-hardener mixture, said epoxy resin being a bisphenol epichlorohydrin polymer having an epoxide equivalent of about 180–205, said hardener effecting curing of said epoxy resin during heating of the member.

7. In the method of insulating an electrical current carrying conductor adapted for use on an electrical apparatus, the steps comprising subjecting the electrical conductor to a vacuum below 20 mm., then with the electrical conductor subjected to said vacuum, immersing it into a mixture of an epoxy resin and a hardener, then subjecting the mixture to a pressure of at least 50 p.s.i., withdrawing the electrical conductor from the mixture and removing the excess mixture therefrom, then treating said electrical conductor with a fast film forming mixture to coat said conductor with a film of said film forming mixture to seal in said first mentioned mixture in said conductor and prevent leakage thereof from the conductor and to preserve said first mentioned mixture in an uncured state, after said conductor has been mounted upon said electrical apparatus, curing said first mentioned mixture by subjecting said conductor to heat, avoiding curing said first mentioned mixture until after said conductor has been mounted upon said apparatus, said epoxy resin being a bisphenol epichlorohydrin polymer having an epoxide equivalent of about 180–205, said hardener effecting curing of said epoxy resin during heating of the member.

8. The method of claim 7 characterized by said resin-hardener mixture having a viscosity of about 40–60 poises at 25° C.

9. The method of claim 7 characterized by said epoxy resin-hardener mixture composing 96.5 to 99% epoxy resin and 1–3.5% boron trifluoride amine complex.

10. The method of claim 7 characterized by said epoxy resin-hardener mixture being 40–70% epoxy resin, 30–60% methyl nadic anhydride, and 0.2–1% alpha methyl benzyl dimethylamine.

References Cited in the file of this patent

UNITED STATES PATENTS

| | | |
|---|---|---|
| 1,988,039 | Grob | Jan. 15, 1935 |
| 2,298,862 | Balz et al. | Oct. 13, 1942 |
| 2,322,924 | Daiger | June 29, 1943 |
| 2,354,551 | Sawyer | July 25, 1944 |
| 2,664,364 | Thom | Dec. 29, 1953 |
| 2,813,047 | Ernst et al. | Nov. 12, 1957 |

OTHER REFERENCES

Skeist: "Epoxy Resins," Reinhold Pub. Co., N.Y., 1958, pp. 173–179 relied on.